United States Patent
Khoury et al.

[11] Patent Number: 5,604,634
[45] Date of Patent: Feb. 18, 1997

[54] ALL OPTICAL NONLINEAR JOINT FOURIER TRANSFORM CORRELATOR

[75] Inventors: Jihad Khoury, Arlington; Charles L. Woods, Stow, both of Mass.

[73] Assignee: The United States of America as represented by the Secretary of the Air Force, Washington, D.C.

[21] Appl. No.: 300,692

[22] Filed: Sep. 20, 1993

[51] Int. Cl.[6] .............................. G02B 27/46; G03H 1/02; G03H 1/16
[52] U.S. Cl. ............................ 359/559; 359/561; 359/7; 359/29
[58] Field of Search .................. 359/7, 29, 559, 359/560, 561

[56] References Cited

U.S. PATENT DOCUMENTS

| | | | |
|---|---|---|---|
| 4,674,824 | 6/1987 | Goodman et al. | 359/559 |
| 4,948,212 | 8/1990 | Cheng et al. | 359/561 |
| 4,971,409 | 11/1990 | Yeh et al. | 359/7 |
| 5,119,443 | 6/1992 | Javidi et al. | 359/561 |
| 5,175,775 | 12/1992 | Iwaki et al. | 359/561 |
| 5,282,067 | 1/1994 | Liu | 359/561 |

*Primary Examiner*—Paul M. Dzierzynski
*Assistant Examiner*—Audrey Chang
*Attorney, Agent, or Firm*—Robert L. Nathans

[57] ABSTRACT

A fully parallel, self-aligning, nonlinear and all optical joint transform correlator utilizes a photorefractive four wave mixer positioned to record the joint transform spectrum interfering with a reference beam together with a phase conjugator which directs a readout beam at the four wave mixer. The signal readout of the mixer is Fourier transformed and can be recorded upon an image sensor to detect the correlation spots indicating the degree of similarity of the two input images.

30 Claims, 1 Drawing Sheet

ALL OPTICAL NONLINEAR JOINT FOURIER TRANSFORM CORRELATOR

STATEMENT OF GOVERNMENT INTEREST

The invention described herein may be manufactured and used by or for the Government for governmental purposes without the payment of any royalty thereon.

BACKGROUND OF THE INVENTION

The Joint Transform Correlator (JTC) is well know to be one of the more convenient devices for correlating two images in the sense that there is no need to fabricate holographic filters, such as matched filters or Phase Only Filters. The classical joint transform correlator requires a quadratic-processor in the Fourier plane. Prior work on nonlinear detection and processing of joint transform signals has shown the great usefulness of this approach; see B. Javidi, "Nonlinear joint power spectrum based optical correlation", Appl. Optics,28,, 2358–2367 (1989). All photorefractive correlators to date were operated primarily in the linear regime and did not implement the quadratic nonlinearity. In order to implement the required nonlinearity digital processing has been used via a camera, a computer and/or a computer, see the aforesaid Javidi publication. These serial operations have compromised many of the advantages sought in parallel optical processing. We show here that the nonlinearities necessary to realize a phase only JTC can be accomplished in parallel and real time through an optical photorefractive limiting quadractic processor. Nonlinear joint transform correlation becomes fully parallel, self-aligning and fully optical for the first time.

The phase only filter in particular is superior to other filters such as matched filters for detecting signals embedded in clutter noise. In addition the phase only filter allows high discrimination ability. These properties have generated interest in phase only nonlinear joint transform correlators. The invention presented here is believed to be the first implementation of photorefractive in the area of phase only joint transform correlation operation. The results at this stage are still preliminary but can be improved through using different crystal cuts which is the subject of future development of this new type of device. The device can be rapidly optically tuned by changing the intensities of the input light beams to provide different types of filters desired for varying additive noise and clutter environments. The broader classical matched filter correlation peak is more appropriate for environments having strong additive noise and no clutter, whereas the phase only filter is preferred for environments with clutter. In the saturation regime, the device functions as an inverse filter which is appropriate where their is no clutter or noise as in a controlled robotics environment.

BRIEF SUMMARY OF AN EMBODIMENT OF THE INVENTION

The aforesaid goals are met by providing a photorefractive crystal for receiving a joint power spectrum (JPS) between Fourier transforms of a signal image and a reference image positioned at the input of the nonlinear joint transform correlator(NJTC). The crystal is illuminated with a reference beam to form a phase hologram within the crystal. A second lens directs the JPS at a self pumped phase conjugator and the resulting conjugate Fourier spectrum is redirected back upon the crystal. This beam becomes a readout beam for the grating within the crystal, and the resulting output beam is inverse Fourier transformed to produce the desired cross-correlation signals.

BRIEF DESCRIPTION OF THE DRAWINGS

Various features of the invention will become more apparent upon study of the following description taken in conjunction with the drawings in which.

DETAILED DESCRIPTION OF EMBODIMENTS OF THE INVENTION

Figure 1:
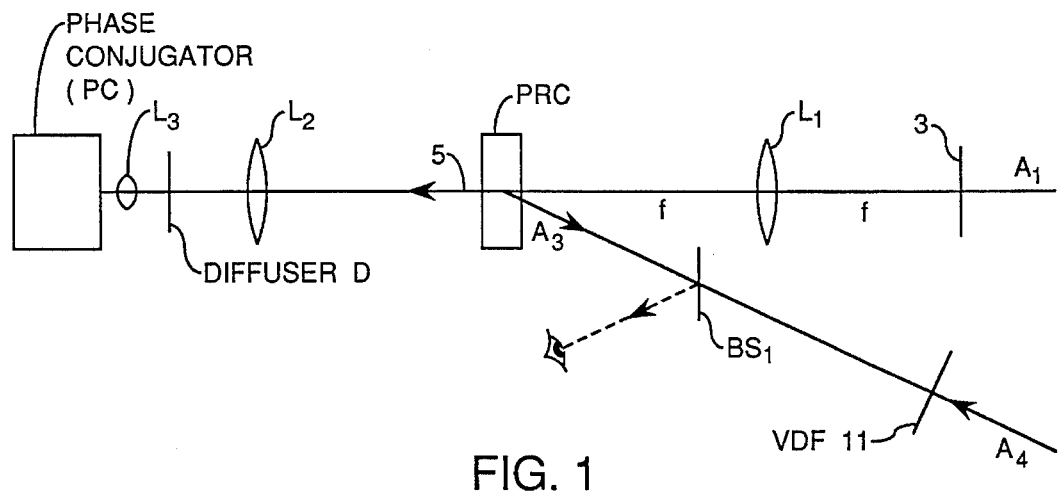
FIG. 1 schematically illustrates the basic principle of the invention.

For implementing the JTC of the present invention, it is desirable to design a photorefractive limiting device which possess the two nonlinearities simultaneously (i.e. quadratic as well as saturation). A device which possesses these two nonlinearities is shown in FIG. 1. The operation of the device can be understood qualitatively as follows: The reference and signal images are placed side by side on a transparency 3 with magnitude s(x,y). Beam A1 passes through the transparency and then through Fourier transform lens L1. The resultant Fourier transform appears at the photorefractive crystal PRC where it interferes with reference beam A4. After passing through the photorefractive crystal, the exiting beam 5 colinear with beam A1 is coupled by lens L2 into a self-pumped phase conjugator PC. The phase conjugated Fourier spectrum diffracts from the hologram which was written by beams A1 and A4 to produce the output A3 which can be observed via beamsplitter BSI1. Note that the self-pumped phase conjugator allows the device to be self-aligning. For a good description of the nature of phase conjugators, see "Scientific American", Dec. 1985, pages 54–59.

It is easy to show that the nonlinear transfer function of this device for photorefractive crystals with small electro-optic coefficients is given by, $$f(s) = \frac{\gamma L \beta^{1/2} I_1 A_4 |S(u,v)|^2 \exp(i(\phi_1 + \phi_2))}{I_1(\beta+1)|S(u,v)|^2 + I_4} \quad (1)$$

where $\beta$ is the overall roundtrip reflectivity of the part of the device to the left of the image processing crystal. The other parameters are $\gamma$ which is the coupling coefficient, $L$ which is the crystal thickness, $S(u,v)$ which is the Fourier transform of s(x,y), $I_1$ which is the intensity of beam $A_1$ and $I_4$ which is the intensity of beam $A_4$. Note that the amplitude of each beam can be written as, $$A_1 = \sqrt{(I_1)} \, \exp(i\phi_3) \quad (2)$$

From equation (1) it is clear that the nonlinear transfer function of this device has both required nonlinearities, the quadratic as well as the saturation. In order to achieve the saturation nonlinearity over a large dynamic range, it is required that $I_1$ be large enough so that the second term in the denominator of equation 1 is no longer significant. In this limiting case it is possible to write our clipping in the form of equation (3) and at the hard clipping limit it is possible to approximate the nonlinear transform function as set forth in equation (4) below.

$$f(s) = \frac{\gamma L \beta^{1/2} I_1 A_4}{\beta + 1} = Z_{clip} \text{ when } I_1(\beta+1)|S(u,v)|^2 \gg I_4 \quad (3)$$

-continued $$f(s) = \frac{\gamma L \beta^{1/2} I_1 A_4 |S(u,v)|^2}{I_4} \quad I_1(\beta+1)|S(u,v)|^2 \ll I_4$$

$$f(s) \sim Z_{clip}(|S(\mu_x, \mu_y)|^2)^0 \quad (4)$$

$( )^0$ indicates the zeroth order nonlinearity; ibid Javidi. Suppose that the $s(\mu_x,\mu_y)$ consists of the summation of the Fourier transform of two images.

$$S(\mu_x, \mu_y) = F(\mu_x, \mu_y) + G(\mu_x, \mu_y) \quad (5)$$

then through the nonlinear transform method described in the aforesaid Javidi reference, it is possible to develop the nonlinear transfer function for the zeroth order nonlinearity for our device. We can show that, $$f(s) = Z_{clip} \sum_{(k=1)}^{\infty} \frac{\epsilon_k \cos(2kx_0\mu_x + k\phi_f(\mu_x,\mu_y) - k\phi_g(\mu_x,\mu_y))}{\Gamma(1-k/2)\Gamma(1+k/2)} \quad (6)$$

where $\Gamma$ is the mathematical gamma function, $\phi_f(\mu_x, \mu_y)$ and $\phi_g(\mu_x, \mu_y)$ are phases of F and G respectively, $x_0$ is the separation between the two images in the image plane and $\epsilon_k$ is given by $$\epsilon_k = \begin{cases} 1, k=0 \\ 2, k>0 \end{cases} \quad (7)$$

Phase only correlation occurs as shown in equation 5 when k=1. The other terms expressed in the equation are higher order terms.

In materials with small electro-optic coefficients in order to reach the clipping limit for a large range of spatial frequencies, it is required that $I_4 \ll I_1$. Therefore according to equation 1, f(s) becomes very small which makes detection experimentally difficult to realize. In these cases it may be necessary to use materials with high electro-optic coefficients. However, by changing the material, the nonlinear transfer function given by Eqn. 1 is no longer valid due to the large energy transfer coupling effects. Since we require that $I_1 \gg I_4$ then the undepleted pump approximation is valid. In this case we can rewrite the clipping limit in terms of intensity as, $$|Z_{clip}|^2 = |A_4|^2 \left( \frac{\sinh(0.5\gamma L)}{\cosh 0.5\gamma L + 0.5\ln\beta} \right)^2 \quad (8)$$

In the diffusion limit, $\gamma$ is a real number. In this case using the theory of the phase of the phase conjugate beam [11] indicates that the phase of A3 or the phase of $Z_{clip}$ is flat.

Therefore the clipping limit in terms of field in the region where $|S|^2 \gg I_4$, satisfies the relationship, $$Z_{clip} = A_4 \left( \frac{\sinh(0.5\gamma L)}{\cosh(0.5\gamma L + 0.5\ln\beta)} \right) \quad (9)$$

The nonlinear transfer function of this device rectifies the phase in a manner similar to quadratic processing and clips the amplitude similar to the zero order nonlinearity. These conditions are necessary for implementing the NJTC in an inverse filter correlation operation regardless of how the hard clipping limit has been reached. See the aforesaid Javidi paper.

Figure 2:
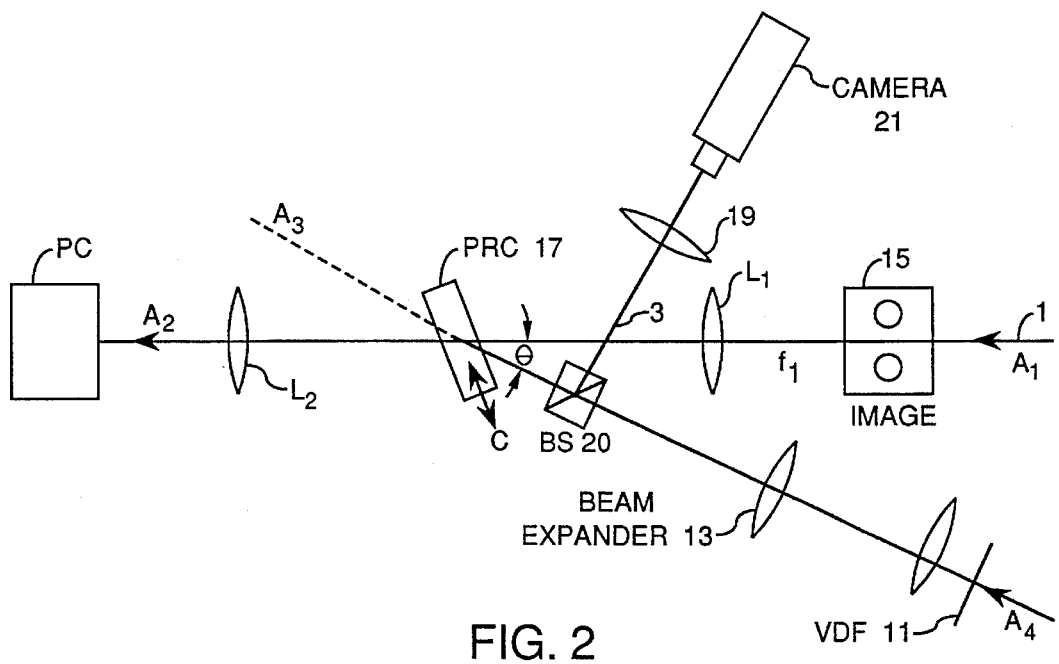
FIG. 2 illustrates an experimental setup for demonstrating a presently preferred embodiment of the invention.

The experimental arrangement for our saturated NJTC is shown in FIG. 2. Beam 4 passes through variable neutral density filter 11 and is then expanded via a simple telescopic beam expander 13 to a diameter of 4 millimeters (nun). The intensity of beam 4 was measured to be 0.001 mw/mm2. Beam 1, has an intensity of 1.8 mw/mm2 and a diameter of 2 mm. Beam 1 is configured so that it passes through a mask having many pairs of circular holes. Each pair represents a signal and reference object. The apparatus in configured such that only one image pair is present on mask portion 15 at a time while being illuminated by beam 1. Filters such as VDF may be placed in the beams directed at the photorefractive device to adjust the spatial beam intensities to obtain the desired spatial output nonlinearity to optimize the signal (or peak)-to-noise-ratio while maintaining a high peak correlation intensity.

These objects are Fourier transformed by lens L1 whose focal length $f_1=16$ cm into a Barium Titanate crystal 17 of 7.5 mm on a side. Beams 1 and 4 interfere on the crystal thereby forming a phase hologram. The intersection angle between the two beams was 20 degrees but could vary. If reflection geometry is used, this angle would be about 180 degrees. As previously described, the resultant joint spectrum of the two images at the output of the crystal are optically coupled into a Barium Titanate self-pumped phase conjugator PC. The self-pumped phase conjugator is necessary in order to generate the conjugate Fourier spectrum which acts as a self-aligning readout beam for the phase grating. The output beam 3 was directed at lens 19 via BS 20 and was Fourier transformed by the lens of focal length $f_3=15$ cm and thereafter directed at camera 21. The optical coupling to the phase conjugator PC, could include additional components such as diffuser D and lens L3 to improve the performance of the phase conjugator. The distances between PRC, D, PC and the lenses may be adjusted to optimize properties such as the spatial fidelity of the PC.

This correlator still has two major problems which are lack of resolution due to beam crossing as well as a slow response time. These problems can be overcome if the crystal is setup in a reflection geometry such that the incident beams are colinear. In this case, the beam crossing problem is eliminated and the grating spacing is small so that the resolution is very high. In addition the speed increases because materials with large electro-optic coefficients such as Barium Titanate have p-type carriers (holes) so that the speed increases with smaller grating spacing. See G. C. Valley and M. B. Klien, "Optimal properties of photorefractive material for optical data processing", Opt. Eng., 22, 704–711 (1983). This is in contrast with the Sillenite family. Recently there were some reports about the ferroelectric crystals KNbO3 which has a response time of 5 milliseconds in the reflection geometry with large efficiency. See V. A. Dyakov et al., "Reflection grating photorefractive self-pumped ring mirror", Optics Letters, 16,1614–1616 (1991). This holds the promise of operating our proposed device at video frame rates. The JTC output could be monitored in time as the photorefractive hologram develops while monitoring the strength of the correlation output as the nonlinearity changes in time. In addition, performance could be tuned by such effects as applying a voltage on the photorefractive material or shifting the frequencies of the optical beams including moving and phase/amplitude-modulated grating techniques. These devices can also be implemented with both thin and thick holographic materials. Additionally, nonlinear four-wave mixing materials and nonlinear optical wave coupling means can also be used.

In conclusion, we have proposed and demonstrated a nonlinear all optical self-aligning nonlinear JTC photorefractive correlator for the first time. This correlator correlates two images via saturating and eliminating the phase information of the joint spectrum of the two images. The first order Fourier expansion of this correlator output should behave as a phase-only correlator. In this limit it is required that the four wavemixing operates under the undepleted pump approximation. However, this type of correlation has a variety of operating conditions. These conditions are dependent on (γ, positive or negative) as well as the beam intensity ratios. Proper operating conditions can produce a range of discrimination from the generality of the matched filter to the high discrimination ability of the inverse filter.

Since variations in the embodiments described will be apparent to those skilled in the art, the scope of the invention is to be limited only by the terms of the following claims and art recognized equivalents thereto. The term "nonlinear four-wave mixing" is intended to include but not be limited to nonlinear holographic materials and higher order means such as six-wave mixing and resonantly enhanced materials. The term "nonlinear optical wave coupling means" is intended to include but not be limited to nonlinear holographic material means and is intended to include nth order nonlinear optical means such as wave mixing means and single and multiple wave resonant means.

What is claimed is:

1. A nonlinear joint Fourier transform image correlator (JTC) comprising:
   (a) joint image production means for producing a single signal beam having an intelligence bearing joint image of a reference image and a signal image;
   (b) first Fourier transform means for producing a joint transform spectrum (JTS) of the single signal beam at a Fourier transform plane;
   (c) a nonlinear holographic recording means positioned at the Fourier transform plane for receiving said JTS;
   (d) reference input beam means illuminating said nonlinear holographic recording means with a reference beam for forming a hologram thereon having a grating associated therewith;
   (e) phase conjugating means for forming a counter-propogating phase conjugate JTS in said nonlinear holographic recording means to produce an output beam therefrom; and
   (f) a second Fourier transform means for inverse Fourier transforming the nonlinear holographic recording means output beam to produce a cross-correlation output signal from said JTC.

2. The JTC of claim 1 wherein said phase conjugator is a self pumped phase conjugator.

3. The JTC of claim 2 wherein said nonlinear holographic recording means is a four wave mixer.

4. The JTC of claim 3 wherein said nonlinear holographic recording means comprises a photorefractive material.

5. The JTC of claim 4 including means for adjusting the intensity of one or more beams directed at the nonlinear holographic recording means to obtain the desired output nonlinearity over a useful input dynamic range.

6. The JTC of claim 3 including means for adjusting the intensity of one or more beams directed at the nonlinear holographic recording means to obtain the desired output nonlinearity over a useful input dynamic range.

7. The JTC of claim 2 wherein said nonlinear holographic recording means comprises a photorefractive material.

8. The JTC of claim 1 wherein said nonlinear holographic recording means is a four wave mixer.

9. The JTC of claim 8 wherein said nonlinear holographic recording means comprises a photorefractive material.

10. The JTC of claim 8 including means for adjusting the intensity of one or more beams directed at the nonlinear holographic recording means to obtain the desired output nonlinearity over a useful input dynamic range.

11. The JTC of claim 1 wherein said nonlinear holographic recording means comprises a photorefractive material.

12. The JTC of claim 1 including means for adjusting the intensity of one or more beams directed at the nonlinear holographic recording means to obtain the desired output nonlinearity over a useful input dynamic range.

13. A nonlinear joint Fourier transform image correlator (JTC) comprising:
   (a) joint image production means for producing a single signal beam having an intelligence bearing joint image of a reference image and a signal image;
   (b) first Fourier transform means for producing a joint transform spectrum (JTS) of the single signal beam at a Fourier transform plane;
   (c) a nonlinear four-wave mixing means positioned at the Fourier transform plane for receiving said JTS;
   (d) reference input beam means illuminating said nonlinear four-wave mixing means with a reference beam;
   (e) phase conjugating means for forming a counter-propogating phase conjugate JTS in said nonlinear four-wave mixing means to produce an output beam therefrom;
   (f) optical means for optically coupling the four-wave mixing means and the phase conjugating means together;and
   (g) a second Fourier transform means for inverse Fourier transforming said output beam to produce a cross-correlation output signal from said JTC.

14. The JTC of claim 13 wherein said phase conjugator is a self pumped phase conjugator.

15. The JTC of claim 14 wherein said nonlinear four-wave mixing means is a nonlinear holographic recording means.

16. The JTC of claim 15 wherein said four-wave mixing means comprises a photorefractive material.

17. The JTC of claim 15 including means for adjusting the intensity of one or more beams directed at the nonlinear holographic recording medium to obtain the desired output nonlinearity over a useful input dynamic range.

18. The JTC of claim 14 wherein said four-wave mixing means comprises a photorefractive material.

19. The JTC of claim 13 wherein said nonlinear four-wave mixing means is a nonlinear holographic recording means.

20. The JTC of claim 19 wherein said four-wave mixing means comprises a photorefractive material.

21. The JTC of claim 13 wherein said four-wave mixing means comprises a photorefractive material.

22. The JTC of claim 13 including means for adjusting the intensity of one or more beams directed at the nonlinear holographic recording medium to obtain the desired output nonlinearity over a useful input dynamic range.

23. A nonlinear joint Fourier transform image correlator (JTC) comprising:
   (a) joint image production means for producing a single signal beam having an intelligence bearing joint image of a reference image and a signal image;
   (b) first Fourier transform means for producing a joint transform spectrum (JTS) of the single signal beam at a Fourier transform plane;
   (c) a nonlinear optical wave coupling (NOWC) means positioned at the Fourier transform plane for receiving said JTS;

(d) reference input beam means illuminating said NOWC means with one or more reference beams;

(e) phase conjugating means for forming a counter-propagating phase conjugate JTS in said NOWC means to produce an output beam therefrom;

(f) optical means for optically coupling the NOWC means and the phase conjugating means together; and (g) a second Fourier transform means for inverse Fourier transforming said output beam to produce a cross-correlation output signal from said JTC.

24. The JTC of claim 23 wherein said phase conjugator is a self pumped phase conjugator.

25. The JTC of claim 24 wherein said NOWC means is a nonlinear holographic recording means.

26. The JTC of claim 25 wherein said NOWC means comprises a photorefractive material.

27. The JTC of claim 24 wherein said NOWC means comprises a photorefractive material.

28. The JTC of claim 23 wherein said NOWC means is a nonlinear holographic recording means.

29. The JTC of claim 28 wherein said NOWC means comprises a photorefractive material.

30. The JTC of claim 23 wherein said NOWC means comprises a photorefractive material.

\* \* \* \* \*